US006432172B1

(12) United States Patent
Lawrence et al.

(10) Patent No.: US 6,432,172 B1
(45) Date of Patent: Aug. 13, 2002

(54) METHOD OF TREATING SYMPTOMS OF PANIC ATTACKS

(75) Inventors: Lowell J. Lawrence, Richmond; Stephen M. Cox, Lexington, both of KY (US)

(73) Assignee: PTRL East, Inc., Richmond, KY (US)

( * ) Notice: Subject to any disclaimer, the term of this patent is extended or adjusted under 35 U.S.C. 154(b) by 0 days.

(21) Appl. No.: 08/612,049

(22) Filed: Mar. 7, 1996

(51) Int. Cl.$^7$ ............................................. B01D 53/62
(52) U.S. Cl. ................................. 95/139; 128/205.28
(58) Field of Search .......................... 95/139; 423/230; 128/200.24, 205.28

(56) References Cited

U.S. PATENT DOCUMENTS

| 923,776 A | * | 6/1909 | Danielwicz ............ 128/205.28 |
| 3,655,346 A | * | 4/1972 | Cotabish et al. ............ 128/202 |
| 3,659,400 A | * | 5/1972 | Kester .......................... 95/139 |
| 4,162,298 A | * | 7/1979 | Holladay et al. ........... 423/230 |
| 4,266,539 A | | 5/1981 | Parker et al. |
| 4,807,614 A | | 2/1989 | Van Der Smissen et al. |
| 4,919,904 A | | 4/1990 | Shukik et al. |
| 5,027,810 A | | 7/1991 | Patureau et al. |
| 5,195,512 A | | 3/1993 | Rosso |
| 5,398,678 A | | 3/1995 | Gamow |
| 5,441,528 A | | 8/1995 | Chang et al. |
| 5,457,100 A | | 10/1995 | Daniel |
| 5,690,101 A | * | 11/1997 | Kutta .................... 128/202.26 |

OTHER PUBLICATIONS

Ley, Ronald, "The 'Suffocation Alarm' Theory of Panic Attacks: A Critical Commentary", Journal of Behavior Therapy and Experimental Psychiatry, pp. 269–273, vol. 25, No. 4.*

Brake and Bates, "Criteria for the Design of emergency refuge stations for an underground metal mine", The AusIMM Proceedings, 1999, pp. 1–7.*

Survivair Internet disclosure, "Dioxscrub–P (Personal Mask Type CO2 Scrubber)", www.kairos.co.za/survivair/DixscrubP.htm.*

Internet disclosure, "Morgan Hex Scrubber", www.divelab.com/divelab/mainpages/hex.htm, Sep. 2001, pp. 1–4.*

Internet disclosure, "Morgan Hyperbaric Scrubber", www.divelab.com/divelab/mainpages/mhs.htm, Aug. 2001, pp. 1–3.*

Ley, Ronald, The 'Suffocation Alarm' Theory of Panic Attacks: A Critical Commentary, Journal of behavior therapy and experimental psychiatry, pp. 269–273, vol. 25, No. 4, 1994.*

Cox, Stephen et al; Single Ion Gas Chronographic/Mass Spectroscopic Quantitative Analysis of Environmental $CO_2$ in Agoraphobic Environments; Anxiety 1:275–7; May 4, 1995.

* cited by examiner

*Primary Examiner*—Robert A. Hopkins
(74) *Attorney, Agent, or Firm*—King and Schickli, PLLC

(57) ABSTRACT

A method is provided for treating an individual for the symptoms of panic disorder and related maladies including agoraphobia, social phobia and claustrophobia. The method includes the step of reducing the levels of carbon dioxide being inspired by the individual.

5 Claims, 1 Drawing Sheet

METHOD OF TREATING SYMPTOMS OF PANIC ATTACKS

TECHNICAL FIELD

The present invention relates generally to the medical treatment field and, more particularly, to a method of treating the symptoms of panic attacks resulting from panic disorder, agoraphobia, social phobia and claustrophobia.

BACKGROUND OF THE INVENTION

Anxiety has been defined as a feeling of fear, dread or apprehension that arises without a clear or appropriate justification. Anxiety includes a number of symptoms that are physical, psychological and behavioral in nature. Anxiety during a panic attack may manifest itself in a number of physical signs that are typically produced from over activity of the sympathetic nervous system or even from tension in the skeletal muscles. These physical manifestations include palpitations, dry mouth, dilation of the pupils, sweating, throat tightening, trembling, dizziness and even nausea. Psychological manifestations include irritability, restlessness and loss of concentration. Behavioral manifestations primarily include avoidance behavior: that is, running away from the feared object or situation.

This avoidance behavior is commonly associated with specific environments including shopping malls, stores, restaurants, church services, meetings, classes, automobiles (particularly on bridges, in tunnels or in congested traffic), airplanes and elevators. Many of these "agoraphobic environments" may be characterized as an enclosed space with a high ratio of the number of people to the volume of air in the enclosed space. Of course, where a relatively large number of individuals are exhaling carbon dioxide ($CO_2$) into a relatively small volume of enclosed space the ambient level of carbon dioxide rises. In fact the $CO_2$ level may rise by as much as 200% or more above the level present in the ambient outdoor atmosphere.

The effects of elevated levels of inspired carbon dioxide on the human brain have been studied. Specifically, carbon dioxide's local tissue vasodilatation effect is the major factor affecting cerebral blood flow. In healthy controls, low concentrations of inspired $CO_2$ have been found to produce central nervous system stimulation. For example, the administration of 5% $CO_2$ has been shown to produce mental confusion, brain vasodilatation, elevated blood pressure and pulse, increased myocardial contractility and constriction of skeletal muscles. Concentrations of 10% or higher have a central nervous system depressant effect in healthy controls and may lead to loss of consciousness within as little as 10 minutes. At 30%, carbon dioxide becomes an anesthetic.

The present inventors are the first to recognize that raised ambient levels of carbon dioxide act as a stimulus for panic attacks in certain "$CO_2$ hypersensitive" individuals. The present invention relates to a method for reducing or eliminating these carbon dioxide induced attacks by means of a relatively simple and unique method.

SUMMARY OF THE INVENTION

Accordingly, it is a primary object of the present invention to provide a method for treating the symptoms of panic disorder in an individual in a simple and straightforward manner to obtain more effective results than provided by prior art approaches.

Still another object of the present invention is to provide a method for treating and substantially eliminating the symptoms of panic disorder in an individual by reducing the levels of inspired carbon dioxide thereby eliminating the "chemical trigger" which induces panic disorder in many individuals.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved method is provided for treating the symptoms of panic disorder. The method may be broadly defined as including the step of reducing the level of inspired carbon dioxide in the individual. More specifically, enclosed spaces frequented by a large number of individuals typically are characterized by increased levels of ambient carbon dioxide. Many individuals suffering from panic disorder are sensitive to these increased carbon dioxide levels. The present invention reduces the amount of carbon dioxide inspired by these individuals to levels generally associated with the outdoor atmosphere or environment. When the level of inspired carbon dioxide is maintained below the $CO_2$ sensitivity threshold of the individual, the chemical trigger that induces the panic attack is effectively removed and the panic attack that would otherwise occur is eliminated.

More specifically describing the invention, the method includes the scrubbing of carbon dioxide from the air being inspired by the individual. This may, for example, be accomplished by providing a carbon dioxide scrubbing device in the ventilation system for the enclosure or by wearing a breathing device equipped with a carbon dioxide adsorbent. Advantageously, by maintaining the carbon dioxide levels in the inspired air below substantially 600 ppm and more preferably 300 ppm, i.e. the level of carbon dioxide in the outdoor atmosphere, many individuals are able to substantially reduce or completely avoid symptoms commonly associated with panic attacks as well as elevated blood pressure and pulse, increased myocardial contractility and constriction of skeletal muscles.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Figure 1:
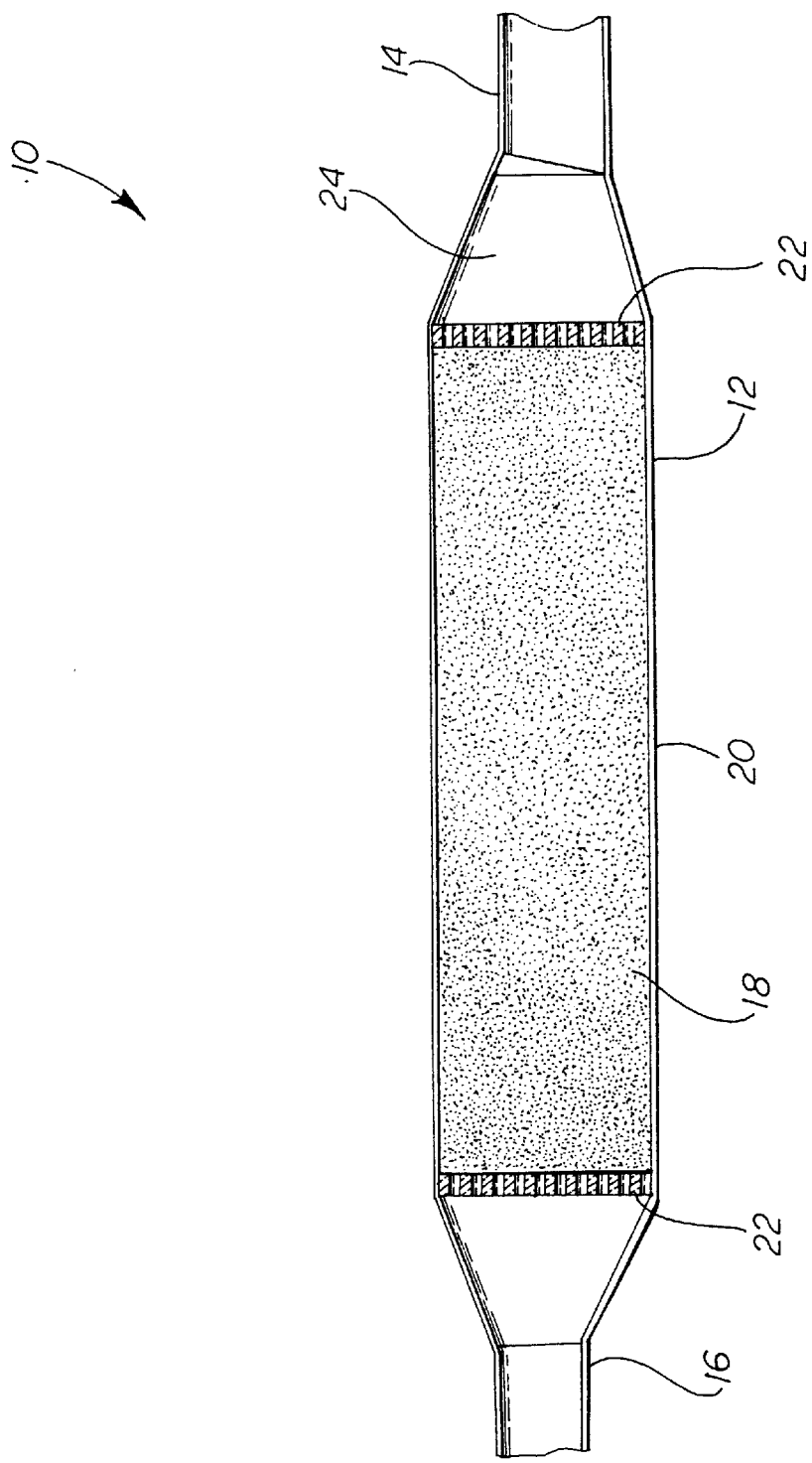
FIG. 1 is a perspective view of a breathing apparatus equipped with a carbon dioxide adsorbent for scrubbing carbon dioxide from air being inspired by the individual wearing the apparatus.

Reference will now be made in detail to the present preferred embodiment of the invention, an example of which is illustrated in the accompanying drawing.

DETAILED DESCRIPTION OF THE INVENTION

As indicated above, the present invention generally relates to a method for treating the symptoms of panic disorder in an individual. The method may be broadly described as including the step of reducing levels of inspired carbon dioxide in the individual. More specifically, this reducing step may include the scrubbing of carbon dioxide from air being inspired by the individual. This may be accomplished by using a breathing apparatus equipped with a carbon dioxide adsorbent. Such an apparatus 10 is shown generally in FIG. 1. The embodiment of the breathing apparatus 10 shown is merely presented for purposes of illustration. Accordingly, it should be appreciated that other designs of breathing apparatus may be utilized in the method of the present invention.

As shown, the breathing apparatus 10 includes an elongate body 12 preferably molded from plastic or other appropriate, light weight material. Body 12 includes a mouth piece 14 at its proximal end to be received in the mouth of the individual receiving treatment and an air inlet 16 at an opposite, distal end. The intermediate section of the body between the mouth piece 14 and inlet 16 defines an enlarged carbon dioxide scrubbing chamber 18. More specifically, carbon dioxide scrubbing chamber 18 is defined by the sidewall 20 of the intermediate section of the body 12 and a pair of porous glass frits 22. The chamber 18 is filled with a carbon dioxide adsorbent. Such carbon dioxide adsorbents are well known in the art. They may comprise lithium hydroxide, calcium hydroxide, sodium hydroxide, potassium hydroxide and mixtures thereof. Such products are sold under various trademarks including SODISORB, a product manufactured by W.R. Grace Company, BARALYME, a product manufactured by Chemitron Corp., as well as DRAEGERSORB and LIMEPAK. Of course, any other carbon dioxide adsorbent appropriate for this purpose may be utilized.

The apparatus 10 may be utilized by an individual in accordance with the method of the present invention as a prophylaxis upon entering an agoraphobic environment or upon experiencing any of the physical, psychological and behaviorable symptoms associated with a panic attack. The apparatus 10 is utilized by placing the mouth piece 14 in the mouth. The individual then closes his or her lips around the mouth piece 14 and inspires air through the apparatus 10. More specifically, air is drawn through the inlet 16, the carbon adsorbent chamber 18 and the mouth piece 14 into the lungs. As the air passes through the carbon adsorbent in the chamber 18, carbon dioxide is cleaned from the air. Preferably, carbon dioxide levels in the inspired air are scrubbed to below substantially 600 parts per million and most preferably substantially 300 parts per million; that level commonly associated with the outside ambient environment.

In order to extend the service life of the carbon dioxide adsorbent, a one-way check valve 24, is preferably provided between the carbon adsorbent chamber 18 and the mouth piece 14. The check valve 24 of the type well known in the art, allows the inward flow or inspiration of air in the direction of action arrow A. Check valve 24, however, blocks air flow in the opposite direction so that an individual may not exhale through the apparatus 10. This prevents the carbon adsorbent in the chamber 18 from being exposed to the relatively high levels of carbon dioxide in expired air. As such, the absorbance capacity of the carbon dioxide adsorbent is preserved to provide a longer service life.

Agoraphobic environments with high levels of ambient carbon dioxide include restaurants, classrooms, churches, vehicles, conference rooms, indoor shopping malls, aircraft cabins and elevators. In fact, actual air samples were taken in order to document the relatively high levels of carbon dioxide found in such environments.

Carbon dioxide levels were determined by taking air samples of approximately 100 ml with TEDLAR 6×6 inch air sampling bags from various locations. Each bag was expanded and evacuated several times before sealing in order to insure that the samples were representative of the areas being sampled.

The carbon dioxide in each sample was quantitated by gas chromatographic/mass spectrometric (GC/MS) analysis using single ion monitoring at 44 amu with a Hewlett Packard model 5890 Series II gas chromatograph coupled to a Hewlett Packard model 5988 A mass spectrometer. The gas chromatographic parameters were:

Analytic Column: J & W Brand GS-Mol (Catalog No.: 115–3622; 30 meters in length; 0.55 mm inside diameter)

Carrier Gas: Helium at 2 psi head pressure

Injector: 150° C.; splitless

Oven Temperature Program: 150° C.–300° C. at a constant rate of 40° per minute

Tramsfer line temperature: 200° C.

The mask spectrometer parameters were:

| | |
|---|---|
| Ionization mode: | Electron Impact (EI) |
| Mass Detection: | m/z = 44; dwell time 100 msec. |
| Electron Multiplier: | 3000 V |
| Ion Source Temperature: | 110° C. |

All lens voltages were set by instrument autotune using perfluorotributylamine (PFTBA). The electron multiplier voltage was set at 3,000 V to enhance sensitivity.

Air samples were analyzed by puncturing the bags with a 100 μl HAMILTON GAS TIGHT syringe. The entire 100 μl air samples were immediately injected into the GC/MS for analysis. Identically handled samples of outside air (rural location in Madison County, Kentucky) were injected immediately before and after each test sample analysis in order to provide a precise baseline of "normal" atmosphere for each test sample analyzed. Carbon dioxide concentrations were determined by integration of the areas under their respective chromatographic peaks and expressed as ratios relative to the outdoor air samples.

The single ion GC/MS analytical chemical analysis revealed increases in carbon dioxide in all agoraphobia environments tested compared to carbon dioxide levels in outdoor air. The magnitude of that increase was at least 101% in all agoraphobic environments tested with the highest concentrations of carbon dioxide (approximately 200% more than outdoor carbon dioxide) being obtained in an elevator, an aircraft cabin and an automobile (see Table 1).

TABLE 1

| Environment | $CO_2$ Concentration in ppm |
|---|---|
| Restaurant 1 | 603 |
| Classroom 1 | 605 |

TABLE 1-continued

| Environment | CO$_2$ Concentration in ppm |
| --- | --- |
| Church 1 | 606 |
| Vehicle 1 | 612 |
| Conference Room 1 | 614 |
| Classroom 2 | 643 |
| Indoor Mall Food Court 1 | 650 |
| Aircraft Cabin 1 | 656 |
| Elevator 1 | 660 |
| Church 2 | 741 |
| Restaurant 2 | 750 |
| Aircraft Cabin 2 | 831 |
| Vehicle 2 | 908 |
| Elevator 2 | 946 |
| Rural Outside Air | 300 |

It is hypothesized that a nearly instantaneous physiological messenger may exist in certain individuals that results in raised levels in carbon dioxide in agoraphobic environments quickly triggering panic attacks some 30–90 seconds after exposure. Physiologists have recently discovered cat cerebellum involvement in the carbon dioxide chemoreflex of ventilation. Specifically, electrical stimulation of cervical vagal afferent evoked potentials in the cerebellum. The cerebellum is capable of modulating the carbon dioxide ventilatory response by influencing medullary by influencing medullary respiratory neuronal activity. The cerebellum has a facilitatory or disinhibitory effect on the ventilatory response to carbon dioxide by modulating the ventilatory sensitivity and threshold to carbon dioxide stimulation (see Xu, F. and Frazier, D.; Cerebellar Role in the Load-Compensating Response of Expiratory Muscle; *American Physiol. Society;* Volume 94; 1994; 1232–8 and Xu, F., Owen, J., and Frazier, D.; Cerebellar Modulation of Ventilatory Response to Progressive Hypercapnia; *American Physiol. Society;* Volume 94; 1994; 1073–80.).

Additionally, it has been shown phasic firing behavior of dog respiratory-related neurons is modulated by activation of vagal afferents. Based upon these findings it seems quite reasonable to hypothesis that carbon dioxide levels of 0.1% may quickly trigger panic attacks through an afferent neuronal signal to the brain in carbon dioxide hypersensitive individuals.

In summary, numerous benefits result from employing the concepts of the present invention. By reducing the level of inspired carbon dioxide reaching an individual, it has been found that it is possible to effectively treat the symptoms of panic disorder in individuals having a hypersensitivity to carbon dioxide. Not only does this allow effective treatment of the symptoms, but it may also help the self esteem of panic disorder patients to learn that their attacks and their fear of commonly recognized agoraphobic environments are triggered by something physical: that is: elevated environmental carbon dioxide levels.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method for treating symptoms of panic attack resulting from panic disorder, agoraphobia, social phobia and/or claustrophobia in an individual, comprising:
   reducing ambient levels of carbon dioxide being inspired by said individual.

2. The method of claim 1, wherein said reducing step includes scrubbing carbon dioxide from ambient air being breathed by said individual.

3. The method of claim 2, including using a breathing apparatus equipped with a carbon dioxide adsorbent.

4. The method of claim 1, including maintaining carbon dioxide levels in inspired air below substantially 600 ppm.

5. The method of claim 1, including maintaining carbon dioxide levels in inspired air below substantially 300 ppm.

\* \* \* \* \*